(12) United States Patent
Takenoshita

(10) Patent No.: US 7,311,854 B2
(45) Date of Patent: Dec. 25, 2007

(54) FERRITE SINTERED BODY, MANUFACTURING METHOD THEREOF, FERRITE CORE USING SAME, AND FERRITE COIL

(75) Inventor: Hidehiro Takenoshita, Kokubu (JP)

(73) Assignee: Kyocera Corporation, Kyoto (JP)

( * ) Notice: Subject to any disclaimer, the term of this patent is extended or adjusted under 35 U.S.C. 154(b) by 284 days.

(21) Appl. No.: 11/077,719

(22) Filed: Mar. 11, 2005

(65) Prior Publication Data

US 2005/0199852 A1   Sep. 15, 2005

(30) Foreign Application Priority Data

Mar. 12, 2004   (JP) ............................. 2004-071421

(51) Int. Cl.
*C04B 35/30* (2006.01)
*H01F 1/34* (2006.01)

(52) U.S. Cl. ............... 252/62.62; 252/62.6; 252/62.57; 252/62.59; 264/611; 264/613

(58) Field of Classification Search ............ 252/62.62, 252/62.6, 62.57, 62.59; 264/611, 613
See application file for complete search history.

(56) References Cited

U.S. PATENT DOCUMENTS

3,028,337 A * 4/1962 Brownlow et al. ......... 264/613

FOREIGN PATENT DOCUMENTS

| JP | 10-045415 | | 2/1998 |
| JP | 2000-191377 | * | 7/2000 |
| JP | 2001-151564 | | 6/2001 |
| JP | 2002-187769 | | 7/2002 |

* cited by examiner

*Primary Examiner*—C. Melissa Koslow
(74) *Attorney, Agent, or Firm*—Hogan & Hartson LLP

(57) ABSTRACT

A ferrite sintered body is composed of an oxide containing, as metal element, at least Fe and Zn and at least one selected from Ni, Cu and Mn. This sintered body contain Fe of 42 to 50 mol % in terms of $Fe_2O_3$, and Zn of 15 to 35 mol % in terms of ZnO. When the Zn concentration in the sintered body interior is taken to be 1, the Zn concentration in the surface vicinity is 0.8 to 12. This increases the surface resistance of the ferrite sintered body and lowers its core loss.

14 Claims, 4 Drawing Sheets

FERRITE SINTERED BODY, MANUFACTURING METHOD THEREOF, FERRITE CORE USING SAME, AND FERRITE COIL

Priority is claimed to Japanese Patent Application No. 2004-71421 filed on Mar. 12, 2004, the disclosure of which is incorporated by reference in its entirety.

BACKGROUND OF THE INVENTION

1. Field of the Invention

The present invention relates to a ferrite sintered body and, in particular, to a ferrite sintered body having a high surface resistance and a low core loss. The invention also relates to a ferrite sintered body having a high magnetic permeability ($\mu$) and a high saturation magnetic flux density (Bs) at the same time, and to a manufacturing method thereof, as well as ferrite cores and ferrite coils using these ferrite sintered bodies.

2. Description of Related Art

A ferrite sintered body, for example, is applied to a ferrite core mounted on an inductor used around a power source, and this application demands a high magnetic permeability, a high saturation magnetic flux density, a high electrical resistance, and a low core loss.

Japanese Patent Application Laid-Open No. 10-45415 discloses a ferrite sintered body composed of a ferrite material of high saturation magnetic flux density that contains, as main component, 54 to 75 mol % of $Fe_2O_3$, 10 to 30 mol % of ZnO, 10 to 25 mol % of NiO, and 3 to 10 mol % of CuO, and further contains 0.1 to 5 parts by weight of $Bi_2O_3$ and 0.1 to 5 parts by weight of $MoO_3$, to 100 parts by weight of this main component.

Japanese Patent Application Laid-Open No. 2001-151564 discloses a ferrite sintered body that contains 48 to 50 mol % of $Fe_2O_3$, 1 to 5 mol % of CuO, and 0.1 to 1 mol % of MnO, and that further contains, as subsidiary component, 0.01 to 0.2 parts by weight of MgO, 0.05 to 0.5 parts by weight of $SiO_2$, 0.05 to 0.5 parts by weight of $Al_2O_3$, and 0.01 to 0.2 parts by weight of $Cr_2O_3$, to 100 parts by weight of a main component in which the mole ratio of ZnO/NiO constituting the residue is 1 to 1.6.

Japanese Patent Application Laid-Open No. 2002-187769 discloses a ferrite sintered body comprising mainly Fe, the main body of which is an oxide of spinel structure containing at least one of Zn, Ni, or Cu, wherein the content of an oxide comprising mainly at least one of Zn, Ni, or Cu is less than 0.01% by volume.

In these ferrite sintered bodies, the ferrite sintered body of Japanese Patent Application Laid Open No. 10-45415 is prepared by firing at 950 to 1250° C., and the ferrite sintered bodies of Japanese Patent Applications Laid-Open Nos. 2001-151564 and 2002-187769 are prepared by firing at 950 to 1400° C. Although these publications disclose no firing conditions other than the firing temperature, generally, a ferrite sintered body is obtained by placing a forming body (green body) on a plate-shaped kiln furniture, and allowing to flow air into a firing furnace without disposing around the forming body any shielding member for shielding the flow of air around the forming body.

However, the ferrite sintered body of Japanese Patent Application Laid-Open No. 10-45415 is high in saturation magnetic flux density but low in surface resistance and high in core loss.

According to Japanese Patent Applications Laid-Open No. 2001-151564, there are attained the characteristics of: Saturation magnetic flux density Bs≧400 mT; Magnetic permeability $\mu$≧500; and Volume resistivity value≧100 MΩ·cm. However, an obtainable ferrite sintered body is low in surface resistance and high in core loss, since the concentration of Zn existing in the vicinity of the sintered body surface is not controlled.

The ferrite sintered body of Japanese Patent Application Laid-Open No. 2002-187769 is high in both saturation magnetic flux density and magnetic permeability, but low in surface resistance and high in core loss.

These problems in the above ferrite sintered bodies may be caused by too low or too high Zn concentration in the surface vicinity of the sintered body than that in the interior.

In these ferrite sintered bodies, to increase the efficiency of firing, air exceeding 1 m³/minute per volume of 1 m³ is allowed to flow into a firing furnace at an atmospheric pressure, resulting in a great velocity of the flow of air. Therefore, a large amount of Zn evaporates from the surface of a forming body during firing, and hence the Zn concentration of the surface portion of the obtained ferrite sintered body is extremely low than that in the interior. When the Zn concentration in the sintered body interior is taken to be 1, the Zn concentration in the surface vicinity is not more than 0.5, so that there are considerable differences in the Zn concentration between the interior and the surface.

Additionally, to avoid a decrease in the Zn concentration in the surface, it is necessary to perform firing with a forming body buried in powder containing much Zn. However, the Zn concentration in the surface of the ferrite sintered body so obtained is extremely high than that in the interior. When the Zn concentration in the sintered body interior is taken to be 1, the Zn concentration in the surface vicinity is not less than 1.5, so that there are large differences in the Zn concentration between the interior and the surface.

SUMMARY OF THE INVENTION

One advantage of the present invention is to provide a ferrite sintered body that is high in electrical resistance and low in core loss by controlling the Zn concentration of the ferrite sintered body.

Other advantage of the present invention is to provide a ferrite sintered body having a high magnetic permeability and a high saturation magnetic flux density.

A ferrite sintered body of the present invention is composed of an oxide that contains, as metal element, at least Fe and Zn and at least one selected from Ni, Cu and Mn, and that contains Fe of 42 to 50 mol % in terms of $Fe_2O_3$, and of 15 to 35 mol % in terms of ZnO. When the Zn concentration in the interior of the sintered body is taken to be 1, the Zn concentration in the surface vicinity is 0.8 to 1.2, thereby increasing the surface resistance of the ferrite sintered body and lowering core loss.

It is preferable to contain Ni of 10 to 30 mol % in terms of NiO, Cu or not more than 8 mol % in terms of CuO, and Mn of 0.01 to 0.5 mol % in terms of MnO. Thereby, when the Zn concentration of the ferrite sintered body interior is taken to be 1, the Zn concentration in the surface vicinity can be controlled to 0.85 to 1.15. Further, a ferrite sintered body can retain a high surface resistance, and magnetic permeability and saturation magnetic flux density can further be improved while retaining low in the core loss at 120° C. or higher.

It is preferable to further contain Zr of not more than 0.1 parts by weight in terms of $ZrO_2$. This permits improvement especially in magnetic permeability and saturation magnetic flux density while retaining a high surface resistance.

It is also preferable to contain Y of not more than 0.1 parts by weight in terms of $Y_2O_3$. This permits improvement especially in magnetic permeablity and saturation magnetic flux density.

Preferably, a ferrite sintered body has a mean crystal particle size of 1 to 30 μm and a sintered density of not less than 5.0 g/cm³. This permits improvement in magnetic permeability and saturation magnetic flux density while retaining high in surface resistance and volume resistivity value.

Preferably, a ferrite sintered body has a surface resistance of not less than $10^9$ Ω. Thereby, when a lead is wound around a ferrite core using a ferrite sintered body so as to obtain a trans coil, a choke coil, a chip inductor, or a ferrite coil for radio frequency identification (RFID), current is less susceptible to short circuit between the lead and the ferrite core, thus attaining one excellent in coil electrical stability.

Preferably, a ferrite sintered body has a volume resistivity of not less than $10^9$ Ω·cm. Thereby, when a lead is wound around a ferrite core using a ferrite sintered body so as to obtain a trans coil, a choke coil, a chip inductor, or a ferrite coil for RFID, its core loss is low, thus attaining one having a high electric efficiency and a low exothermic property.

A method of manufacturing a ferrite sintered body according to the present invention includes a primary grinding step of obtaining primary ground powder by mixing and grinding powder composed of an Fe compound and a Zn compound, and powder composed of a compound of metal element of at least one of Ni, Cu, and Mn; a calcining step of obtaining calcined powder by calcining the primary ground powder; a secondary grinding step of obtaining secondary ground powder by grinding the calcined powder; a forming step of obtaining a forming body (green body) by forming the secondary ground powder into a predetermined shape; and a firing step of obtaining a sintered body by firing the forming body in a firing furnace. In the firing step, the firing is conducted by allowing to flow, into the firing furnace, gas of not more than 1 m³/minute per volume of 1 ml within the firing furnace in an atmosphere of not less than 0.01 MPa in the partial pressure of oxygen; or the firing is conducted by disposing around the forming body a shielding member composed of a metal oxide having a melting point of not less than 1600° C. so as to shield the gas flowing around the forming body. This permits manufacturing a ferrite sintered body that is high in surface resistance and low in core loss. This is because the firing in accordance with the above firing method attains an optimum range of the Zn concentration in the firing atmosphere, and the Zn concentration in the surface vicinity of the sintered body to the Zn concentration in the interior of the sintered body can be controlled to 0.8 to 1.2.

A ferrite core of the present invention is attainable by forming the above ferrite sintered body into a predetermined shape. A ferrite coil of the present invention is attainable by winding a lead around the above ferrite core. The ferrite core and the ferrite coil of the present invention are well applicable to trans coils, choke coils, chip inductors, and ferrite coils for RFID.

DETAILED DESCRIPTION OF PREFERRED EMBODIMENTS

Figure 1A:
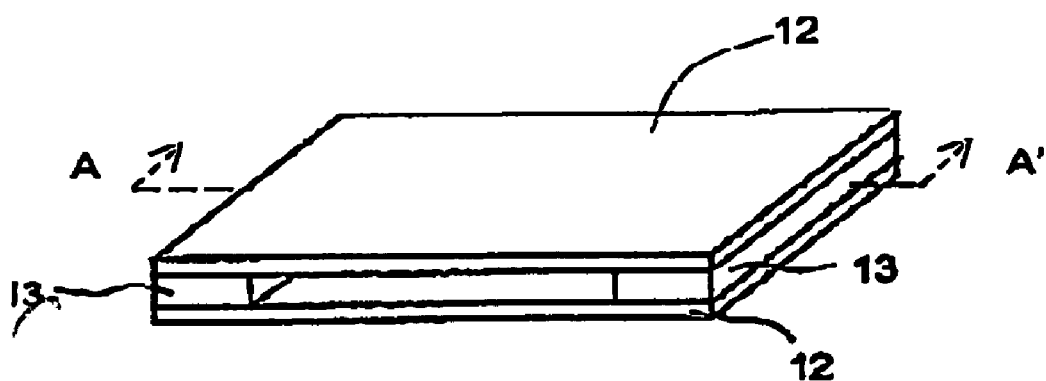
FIG. 1A is a perspective view showing one example of a method of manufacturing a ferrite sintered body of the present invention.

Preferred embodiments of the present invention will now be described in detail.

A ferrite sintered body of the present invention is composed of an oxide that contains, as metal element, at least Fe and Zn and at least one selected from Ni, Cu and Mn. This ferrite sintered body contains Fe of 42 to 50 mol % in terms of $Fe_2O_3$, and Zn of 15 to 35 mol % in terms of ZnO. When the Zn concentration in the sintered body interior is taken to be 1, the Zn concentration in the surface vicinity is 0.8 to 1.2.

This enables to increase the surface resistance of a ferrite sintered body and also lower the core loss at 120° C. The reason for this can be considered as follows.

The purpose of containing Fe of 42 to 50 mol % in terms of $Fe_2O_3$, and Zn of 15 to 35 mol % in terms of ZnO is to avoid that if they do not fall within the specified ranges, the above-mentioned Zn concentration in the surface vicinity may be out of the range of 0.8 to 1.2 when the Zn concentration in the sintered body interior is taken to be 1. When Fe content is less than 42 mol % in terms of $Fe_2O_3$, core loss is increased, and magnetic permeability and saturation magnetic flux density are lowered. When it exceeds 50 mol %, much $Fe^{2+}$ are generated in the sintered body surface vicinity, thereby lowering the electrical resistance such as volume resistivity. It is more preferable to contain Fe of 47 to 50 mol % in terms of $Fe_2O_3$.

When Zn content is less than 15 mol % in terms of ZnO, core loss is increased and magnetic permeability is lowered. When it exceeds 35 mol %, core loss is increased and saturation magnetic flux density is lowered.

The following is the reason why the lower limit of the above-mentioned Zn concentration in the surface vicinity is controlled to 0.8. When the Zn concentration in the surface vicinity is less than 0.8, much of the $Fe^{3+}$ in the vicinity of the sintered body surface changes to $Fe^{2+}$, and at the same time a large amount of holes are generated. As a result, these holes become carriers and hence the above-mentioned surface resistance is lowered. The reason why much of the $Fe^{3+}$ in the vicinity of the sintered body surface changes to $Fe^{2+}$ is as follows. With a low Zn concentration in the firing atmosphere in the step of firing the above-mentioned forming body, the Zn composition in the sintered body surface vicinity sublimates and hence the Zn content in the surface vicinity is lowered. Thereby, the Fe content in the sintered body surface vicinity is higher than that in the interior, and part of the oxygen bonded to the $Fe^{3+}$ existing in the surface vicinity is dissociated.

The following is the reason why the upper limit of the Zn concentration in the sintered body surface vicinity is 1.2. When the Zn concentration in the surface vicinity is greater than 1.2, much of $Fe^{3+}$ in the sintered body interior changes to $Fe^{2+}$, and at the same time a large amount of holes are generated. As a result, these holes become carriers and hence the electrical resistance of the entire sintered body including the sintered body surface is lowered. The reason why much of the $Fe^{3+}$ in the sintered body interior changes to $Fe^{2+}$ is that, with a high Zn concentration in the firing atmosphere in the step of firing the above-mentioned forming body, the Zn in the sintered body interior removes to the surface vicinity and hence the Zn concentration in the surface vicinity is increased. Thereby, the Fe content in the sintered body interior is higher than that in the surface, so that part of the oxygen bonded to the $Fe^{3+}$ existing in the sintered body interior is dissociated. As the electrical resistance of the sintered body decreases, the magnetic loss of the sintered body increases, thereby increasing the core loss of a ferrite core using this sintered body.

To further increase surface resistance and decrease core loss, it is more preferable that, when the Zn concentration in the sintered body interior is taken to be 1, the Zn concentration in the surface vicinity is 0.85 to 1.15.

The Zn concentration of the interior and the surface vicinity of the ferrite sintered body of the present invention are measured in the following manner. For instance, while observing the ferrite sintered body under a scanning electron microscope (SEM), the Zn elementary distributions in the sintered body interior and the sintered body surface vicinity are measured on a wavelength dispersive X-ray microanalyzer (WDS). Measuring conditions at this time are as follows: Acceleration voltage is approximately 15 kV; Probe current is approximately $2 \times 10^{-7}$ A; and Analytic area is approximately $10^3$ $\mu m^2$ to $10^8$ $\mu m^2$. A calibration curve is previously prepared by the use of analytic samples having different Zn concentrations. Then, the Zn concentrations of the sintered body surface and the interior are calculated by calibration curve method of performing calculation from a measuring result and the calibration curve. Examples of other method of measuring Zn concentration are as follows: (i) While observing under a transmission electron microscope (TEM), measurements are taken on an energy dispersive X-ray microanalyzer (EDS); and (ii) Measurements are taken under an atomic force microscope. As used herein, the term "sintered body surface vicinity" means the range from the sintered body surface to a depth of 0.1 mm in its interior direction, and the term "sintered body interior" means the range of the interior extending deeper than 0.1 mm from the surface. The Zn concentrations in the sintered body surface and the interior are measured at least five points each, and the obtained Zn concentrations are averaged.

The approximation of the Zn concentrations in the interior and the surface vicinity of the sintered body as above described is attainable by adjusting the atmosphere in the firing step as will be presented later.

Preferably, the above-mentioned ferrite sintered body contains Ni of 10 to 30 mol % in terns of NiO, Cu of not more than 8 mol % in terms of CuO, and Mn of 0.01 to 0.5 mol % in terms of MnO.

Thereby, when the Zn concentration in the ferrite sintered body interior is taken to be 1, the Zn concentration in the surface vicinity can be controlled to 0.85 to 1.15. This is because the control of Fe, Zn, Ni, Cu, and Mn to their respective ranges will enhance such that the crystal structure is made regularly during firing, thereby suppressing variations in the surface Zn concentration.

Specifically, the inclusion of Ni of 10 to 30 mol % in terms of NiO significantly enhances magnetic permeability and saturation magnetic flux density. With Ni of less than 10 mol % in terms of NiO, saturation magnetic flux density cannot be enhanced significantly. If it exceeds 30 mol %, magnetic permeability cannot be enhanced significantly. The inclusion of Cu of not more than 8 mol % in terms of CuO significantly enhances magnetic permeability and saturation magnetic flux density. To significantly enhance magnetic permeability and saturation magnetic flux density, the lower limit of Cu content is preferably 0.1 mol % in terms of CuO.

When Cu content exceeds 8 mol % in terms of CuO, magnetic permeability and saturation magnetic flux density cannot be enhanced significantly. The inclusion of Mn of 0.01 to 0.5 mol % in terms of MnO further enhances saturation magnetic flux density while retaining a high magnetic permeability. When Mn content is less than 0.01 mol % or over 0.5 mol % in terms of MnO, magnetic permeability and saturation magnetic flux density cannot be enhanced significantly.

It is more preferable to contain Ni of 13 to 25 mol % in terms of NiO, Cu of 2 to 6 mol % in terms of CuO, and Mn of 0.1 to 0.3 mol % in terms of MnO. Thereby, the Zn concentration of the surface to that of the interior can be controlled to 0.9 to 1.1.

Additionally, it is possible to increase surface resistance and decrease core loss by controlling Fe to 49 to 50 mol % in terms of $Fe_2O_3$, Zn to 20 to 30 mol % in terms of ZnO, Ni to 20 to 30 mol % in terms of NiO, Cu to not more than 5 mol % (provided zero is not included) in terms of CuO, and Mn to 0.01 to 0.2 mol % in terms of MnO.

The inclusion of Zr of not more than 0.1 parts by weight (provided zero is not included) in terms of $ZrO_2$ especially enhances saturation magnetic flux density while retaining a high magnetic permeability. When the Zr content exceeds 0.1 parts by weight in terms of $ZrO_2$, saturation magnetic flux density cannot be enhanced significantly while retaining a high magnetic permeability.

To provide a high saturation magnetic flux density, Zr content is more preferably 0.001 to 0.01 parts by weight in terms of $ZrO_2$.

The inclusion of Y of not more than 0.1 parts by weight (provided zero is not included) in terms of $Y_2O_3$ especially enhances saturation magnetic flux density further while retaining a high magnetic permeability. When the Y content exceeds 0.1 parts by weight in terms of $Y_2O_3$, saturation magnetic flux density cannot be enhanced significantly while retaining a high magnetic permeability.

To provide a high saturation magnetic flux density, Y content is more preferably 0.001 to 0.01 parts by weight in terms of $Y_2O_3$.

Alternatively, the ferrite sintered body of the present invention may further contain less than 0.05 parts by weight of at least one of $Al_2O_3$, $SiO_2$, CaO, MgO, $K_2O$, $Cr_2O_3$, $P_2O_5$, $WO_3$, and PbO.

Preferably, the ferrite sintered body of the present invention has a mean crystal particle size of 1 to 30 $\mu m$, and a sintered density of not less than 5.0 $g/cm^3$, thereby enhancing magnetic permeability and saturation magnetic flux density. With a mean crystal particle size of less than 1 $\mu m$, magnetic permeability cannot be enhanced particularly. If it exceeds 30 $\mu m$, magnetic permeability and saturation magnetic flux density cannot be enhanced significantly. To provide a higher magnetic permeability and a higher saturation magnetic flux density, it is more preferable to control mean crystal particle size to 3 to 10 $\mu m$, and sintered density to not less than 5.2 $g/cm^3$.

The above-mentioned mean crystal particle size can be found by taking SEM pictures of a sintered body of which surface is etched with various methods, and measuring the diameters of inscribed circles and circumscribed circles connected to respective crystals, and then averaging to obtain a mean value. Sintered density can be measured by Archimedes' method.

Surface resistance is preferably not less than $10^9 \Omega$. A ferrite core is attainable by forming the above ferrite sintered body into a predetermined shape. When a load is wound around this ferrite core to attain a trans coil, a choke coil, a chip inductor, or a ferrite coil for RFID, current is less susceptible to short circuit between the lead and the ferrite sintered body, thereby providing a ferrite coil excellent in electrical stability.

Volume resistivity is preferably not less than $10^9 \Omega \cdot cm$. A ferrite core is attainable by forming the above ferrite sintered body into a predetermined shape. When a lead is wound around this ferrite core to obtain a trans coil, a choke coil, a chip inductor, or a ferrite coil for RFID, because of low core loss, it has a high electrical efficiency and a low exothermic property.

Carbon content is preferably 100 ppm, because surface resistance and volume resistivity can be enhanced further. Controlling the porosity of the above ferrite sintered body to not more than 1% enhances especially surface resistance and volume resistivity.

The followings are a method of manufacturing the ferrite sintered body as above described.

First, in a primary powder grinding step, for example, powder composed of an Fe compound and a Zn compound, and a starting material powder composed of a compound of a metal element of at least one of Ni, CO and Mn, are mixed and ground to obtain primary ground powder.

For instance, the primary powder grinding step includes: preparing a predetermined amount of raw material powder in which the specific surface areas of $Fe_2O_3$, ZnO, NiO, and CuO exceed 2 $m^2/g$; and then mixing and grinding by the use of a vibration mill, a ball mill, a beads mill, or a jet mill, thereby obtaining primary ground powder. At this time, the specific surface area of the powder after mixing and grinding should exceed 2 $m^2/g$.

The composition of the above starting material powder is powder composed of an oxide containing Fe of 42 to 50 mol % in terms of $Fe_2O_3$, and Zn of 15 to 35 mol % in terms of ZnO, and further containing at least one of Ni, Cu and Mn. The obtained ferrite sintered body has a composition containing Fe of 42 to 50 mol % in terms of $Fe_2O_3$, and Zn of 15 to 35 mol % in terms of ZnO.

The powders of NiO, CuO and MnO are used as the above-mentioned starting material powder, such that the contents of Ni, Cu and Mn fall in their respective ranges.

The succeeding steps are a calcining stop of obtaining calcined powder by calcining the obtained primary ground powder; and a secondary grinding step of obtaining secondary ground powder by grinding the obtained calcined powder.

For instance, in the calcining step, the temperature of the obtained primary ground powder is raised at a temperature raising speed of not more than 2000° C./time, and held at 750 to 950° C. for 0.1 to 5 hours, and is lowered at a temperature lowering speed of not more than 2000° C./time. In the secondary grinding step, to the obtained calcined powder, $ZrO_2$ and $Y_2O_3$ are added and then ground and granulated by the use of a vibration mill, a ball mill, a beads mill or a jet mill.

To attain a ferrite sintered body containing Zr of not more than 0.1 parts by weight (provided zero is not included) in terms of $ZrO_2$, $ZrO_2$ powder is used as the above-mentioned starting material powder, such that Zr is not more than 0.1 parts by weight (provided zero is not included) in terms of $ZrO_2$, or $ZrO_2$ powder is added prior to the calcining step. Although Zr might enter as impurity into a ferrite sintered body, it is a requirement that the Zr content in the finally obtained ferrite sintered body is not more than 0.1 parts by weight.

To attain a ferrite sintered body containing Y of not more than 0.1 parts by weight (provided zero is not included) in terms of $Y_2O_3$, $Y_2O_3$ powder is used as the above-mentioned starting material powder, such that Y is not more than 0.1 parts by weight (provided zero is not included) in terms of $Y_2O_3$, or $Y_2O_3$ powder is added prior to the calcining step. Although Y might enter as impurity into a ferrite sintered body, it is a requirement that the Y content in the finally obtained ferrite sintered body is not more than 0.1 parts by weight.

In a forming step, a forming body is obtained by forming the obtained secondary ground powder into a predetermined shape by press forming or the like.

In a firing step, a sintered body is obtained by firing the forming body within a firing furnace. For example, the sintered body can be obtained by firing at a firing temperature of 950 to 1400° C., and then holding for 0.1 to 5 hours.

In the above description, $ZrO_2$ and $Y_2O_3$ are added after calcination, but the addition of these prior to calcination has no influence on the characteristics of the ferrite sintered body of the present invention.

To obtain the ferrite sintered body of the present invention, it is essential that the above-mentioned firing step includes either of the following first and second firing methods. Thereby, the Zn concentration ratio of the surface vicinity of the obtained ferrite sintered body to the interior can be controlled to 0.8 to 1.2. It is therefore possible to manufacture a ferrite sintered body that is high in surface resistance and low in core loss.

In the first method, firing is performed by setting the partial pressure of oxygen in the firing atmosphere to not less than 0.01 MPa, and allowing to flow gas of not more than 1 $m^3$/minute per volume of 1 $m^3$ within the firing furnace.

This is because controlling the partial pressure of oxygen in the firing atmosphere to not less than 0.01 MPa suppresses the evaporation of Zn from the surface of the forming body so as to minimize the difference of Zn concentration between the sintered body interior and the surface. Further, by allowing to flow gas of not more than 1 $m^3$/minute (provided zero is not included) per volume of 1 $m^3$ within the firing furnace, for example, either of gas composed only of oxygen, or a mixed gas of oxygen and nitrogen, e.g., air, or a mixed gas of oxygen and argon, the Zn concentration of the sintered body surface vicinity can be balanced to control the Zn concentration of the sintered body surface to the Zn concentration of the sintered body interior to 0.8 to 1.2. If the forming body is fired in a gas flow rate exceeding 1 $m^3$/minute per volume of 1 $m^3$ within the firing furnace, the Zn concentration in the atmosphere is lowered, and the evaporation of Zn composition in the forming body surface vicinity is facilitated, so that the Zn concentration of the sintered body surface vicinity to the Zn concentration in the sintered body interior will be less than 0.8, resulting in the risk of a drop in the surface resistance of the obtained sintered body.

To attain a higher surface resistance and a lower core loss at the same time, the flow rate of gas flowing in a firing furnace is more preferably $10^{-5}$ to $10^{-1}$ $m^3$/minute per volume of 1 ml. To reduce manufacturing cost, the firing atmosphere is preferably a pressure less atmosphere (substantially atmospheric pressure).

The flow rate of gas flowing in the firing furnace is measured on a thermal type flowmeter, an ultrasonic flowmeter, or the like.

In the second method, firing is performed by disposing around the forming body a shielding member composed of a metal oxide having a melting point of not less than 1600° C. so as to shield the gas flowing around the forming body.

Figure 1B:
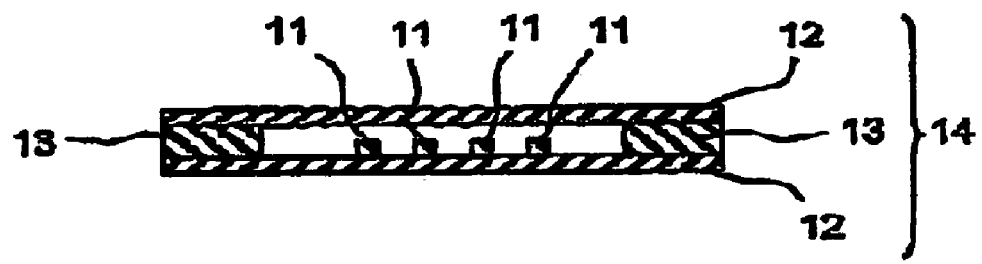
FIG. 1B is a sectional view taken along the line A-A' in FIG. 1A.

FIG. 1A is a perspective view of a first shielding member 14, and FIG. 1B is a sectional view taken along the line A-A' in FIG. 1A. As shown in these figures, a plurality of forming bodies 11 are placed on the main surfaces of two plate-like kiln furniture 12, and the two main surfaces of the two kiln furniture 12 are opposed to each other at a distance greater than the thickness or the forming bodies 11. At least not less than 30% of the area of peripheral portions between the two kiln furniture 12 is covered with a kiln furniture 13. Thus, the first shielding member 14 can be made of the kiln furniture 12 and 13 that function to suppress the flow of the gas flowing around the forming bodies 11.

The first shielding member 14 is composed of a metal element oxide having a melting point of not less than 1600° C., such as alumina, and its melting point is well higher than the firing temperature of a ferrite sintered body. Hence, the first shielding member 14 does not release any gas inhibiting the sintering of an obtainable ferrite sintered body to the firing atmosphere. It is therefore possible to suppress the evaporation of Zn from the sintered body surface and a large amount of Zn diffusion from the sintered body interior, both of which may arise from the generation of such gas.

By disposing the first shielding member 14 around the forming bodies 11, irrespective of the flow rate value of gas flowing in the firing furnace, the concentration of gas including Zn in the atmosphere around the forming bodies 11 can be held substantially constant, and therefore the Zn concentration in the sintered body surface vicinity to the Zn concentration in the sintered body interior can be controlled to 0.8 to 1.2. This permits manufacturing a ferrite sintered body that is high in surface resistance and low in core loss.

Figure 2A:
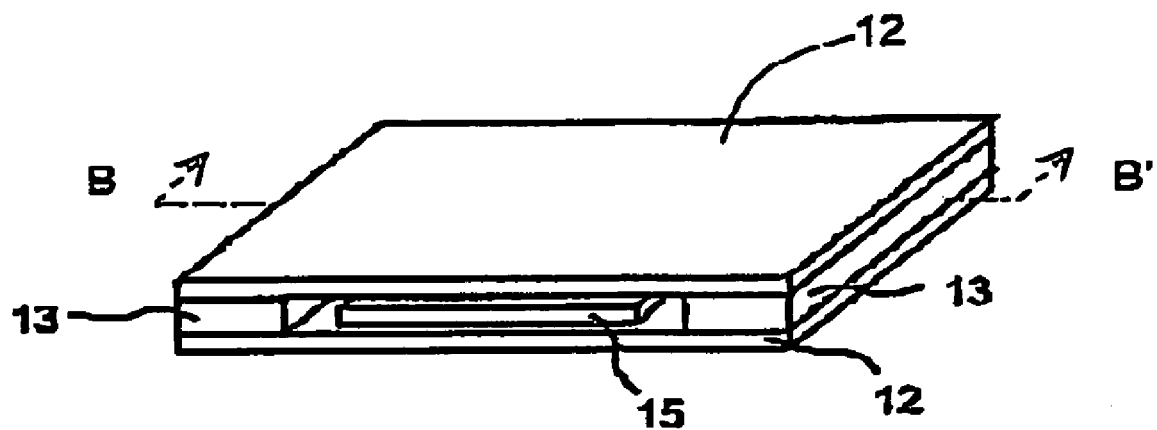
FIG. 2A is a perspective view showing one example of other method of manufacturing a ferrite sintered body of the present invention.
Figure 2B:
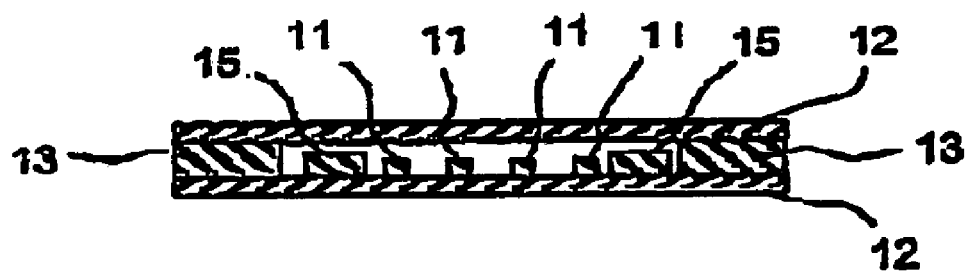
FIG. 2B is a sectional view taken along the line B-B' in FIG. 2A.

FIG. 2A is a perspective view of other example of the first shielding member 14. FIG. 2B is a sectional view taken along the line B-B' in FIG. 2A. A second shielding member 15 is composed of powder P that comprises mainly an oxide composed of any one of metal elements included in the above-mentioned primary ground powder, and contains Zn of 5 to 50 mol % in terms of ZnO. As shown in the figures, by disposing the two second shielding members 15 around the forming bodies 11, the ratio of the Zn concentration in the obtained sintered body surface vicinity to the Zn concentration in the ferrite sintered body interior can be controlled in the range of 0.85 to 1.15. This permits manufacturing a ferrite sintered body that is especially high in surface resistance and low in core loss. The reason for this can be considered that the gas including Zn evaporates from the second shielding members 15 during firing, and the concentration of gas including Zn existing in the firing atmosphere becomes less susceptible to variations.

When the Zn content in the powder P of the second shielding members 15 exceeds 50 mol %, a large amount of Zn diffuses and penetrates into the sintered body from the powder P. This causes the obtained sintered body surface to have too high Zn concentration, so that the Zn concentration of the surface to the Zn concentration of the interior exceeds 1.2. This may decrease surface resistance and increase core loss.

Alternatively, the Zn concentration in the sintered body surface to the Zn concentration in the interior may also be controlled to 1 to 1.2, by arranging the powder P so as to make contact with forming bodies 11. The reason for this can be considered that the evaporation of Zn from the sintered body surface is suppressed.

To eliminate variations of the Zn concentration in the entire surface of a sintered body to the Zn concentration in the ferrite sintered body, it is preferable to bury the whole of the forming bodies 11 in the second shielding members 15 composed of the powder P. This permits attaining a ferrite sintered body, the surface resistance of which is especially large.

To attain a ferrite sintered body having a mean crystal particle size of 1 to 30 µm and a sintered density of not less than 5.0 g/cm$^3$, it is necessary to employ a manufacturing method whereby the specific surface area of the above-mentioned primary ground powder is greater than 2 m$^2$/g, and the mean particle size of the above-mentioned secondary ground powder is 0.4 to 1.5 µm. This method facilitates densification of a obtained ferrite sintered body and also controls the mean crystal particle size to the above-mentioned range.

To attain a surface resistance of not less than $10^9 \Omega$, the temperature of the above-mentioned calcining step is set to not less than 800° C. This is because setting the calcining temperature to not less than 800° C. permits a sufficient synthesis in the calcining step, thereby further suppressing the evaporation of Zn during firing.

To attain a volume resistivity of not less than $10^9 \Omega \cdot cm$, it is necessary to employ a manufacturing method whereby the relative density of the above-mentioned forming body is at least not less than 40%, and the calcining temperature is not less than 850° C. This method permits a sufficient synthesis in the above-mentioned calcining step, thereby particularly suppressing the evaporation of Zn during firing.

The ferrite sintered body so obtained is suitably used as a ferrite core, and a ferrite coil that is made by winding a lead around the ferrite core.

Figure 3A:
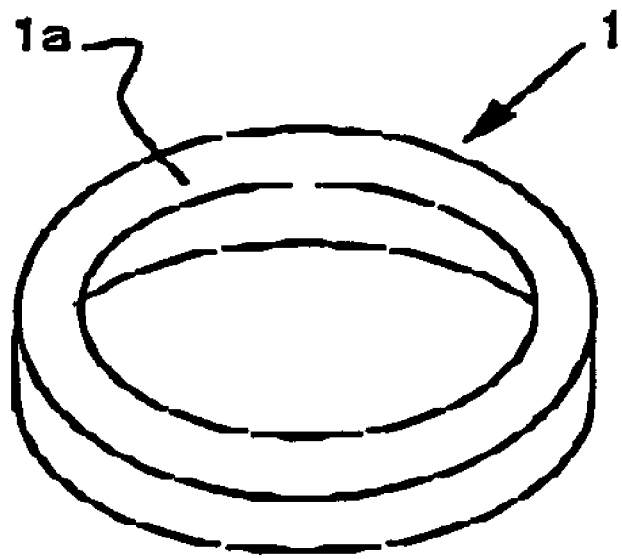
FIGS. 3A and 3B are diagrams showing a ferrite core of the present invention.
Figure 3B:
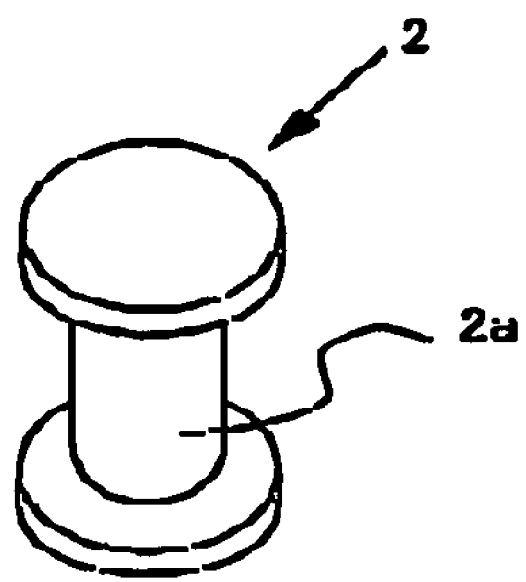

The ferrite core is obtainable by forming the ferrite sintered body into a predetermined shape, such as a ring-shaped toroidal core 1 as shown in FIG. 3A; a bobbin-shaped core 2 as shown in FIG. 3B. The ferrite coil is obtainable by winding a lead around winding portions 1a and 2a, respectively. When a lead is wound around this ferrite core to obtain a ferrite coil such as a trans-coil, a choke coil, a chip inductor, or a ferrite coil for RFID, short circuit of current between the lead and the ferrite core is hard to occur, thus leading to the ferrite coil excellent in electrical stability.

The ferrite core of the present invention has a high magnetic permeability, a high saturation magnetic flux density, a high surface resistance, and a low core loss at 120° C. In addition, surface mounting is available, and heavy-current is usable at a high efficiency, thereby enhancing inductance. Accordingly, the use of this ferrite core as an inductor for purposes of high efficiency and heavy-current contributes to further miniaturization of various electric equipment.

A ferrite coil, in which a lead is wound around this ferrite core, does not cause short circuit of current between the lead and the ferrite core. This ferrite coil is capable of reducing the number of windings and allowing to flow high current, and is less susceptible to heat generation. Therefore, this ferrite coil is suitably applied to general inductors used around a power source and, in particular, to an inductor using a circuit through which high current of not less than 500 mA passes.

Examples of the present invention will be described below. It is understood, however, that the examples are for the purpose of illustration and the invention is not to be regarded as limited in any of the specific materials or condition therein.

EXAMPLES

Example 1

Weighing was performed to obtain 49.0 mol % of $Fe_2O_3$, 24 mol % of Zn, 24 mol % of NiO, 2.7 mol % of CuO, and 0.3 mol % of MnO. With a vibration mill, these were mixed and ground to obtain primary ground powder.

The temperature of the obtained primary ground powder was raised at a temperature raising speed of 2000° C./time, and held at 750 to 950° C. for 0.1 to 5 hours, then the temperature was lowered at a temperature lowing speed of 2000° C./time, followed by calcination. With a ball mill, etc., the calcined powder was ground and then granulated to obtain secondary ground powder.

This secondary ground powder was then subjected to compression molding by the use of a metal mold so as to form into the shape of a toroidal core 1, as shown in FIG. 3.

Thereafter, the obtained forming body was fired by the following firing method in the gas (the gas allowed to flow in a firing atmosphere) and at the partial pressure of oxygen as indicated in Table 1, while adjusting the flow rate of the gas allowed to flow into a furnace (the flow rate of gas within the furnace) per volume of 1 m³ within the furnace.

Firing method using the first shielding member: As shown in FIGS. 1A and 1B, the main surfaces of two plate-like alumina-made firing furniture 12, on which forming bodies 11 were mountable, were opposed to each other at a distance greater than the thickness of the forming bodies 11 and a 50% of the area of peripheral portions between the two firing furniture 12 was covered with a block-made furniture 13 composed of alumina.

Firing method using the second shielding member: As shown in FIGS. 2A and 2B, NiO—ZnO mixed powder (the second shielding member 15) containing Zn of 20 mol % (Sample No. 1) or 30 mol % (Sample No. 2) in terms of ZnO was placed around the forming bodies 11.

Burial firing method: The forming bodies 11 were buried in a mixed powder of ZnO ad NiO (buried in powder containing ZnO in the rate indicated in Table 1) and then fired.

Zn concentrations in the surface and the interior of the obtained ferrite sintered body were measured as follows.

While observing each ferrite sintered body under a scanning electron microscope (SEM), Zn elementary distributions in the sintered body interior and the sintered body surface vicinity were measured on a wavelength dispersive X-ray microanalyzer (WDS). Measuring conditions at this time were as follows: Acceleration voltage was approximately 15 kV; Probe current was approximately $2\times10^{-7}$ A; and Analytic area was approximately $10^3$ μm² to $10^8$ μm². A calibration curve was previously prepared by the use of an analytic samples having different Zn concentrations. Then, Zn concentrations of the sintered body surface and the interior were calculated by calibration curve method of calculating from a measuring result and the calibration curve. The Zn concentration in the sintered body surface vicinity, when the Zn concentration of the sintered body interior was taken to be 1, was defined as Zn concentration ratio. The results are presented in Table 1.

Figure 4:
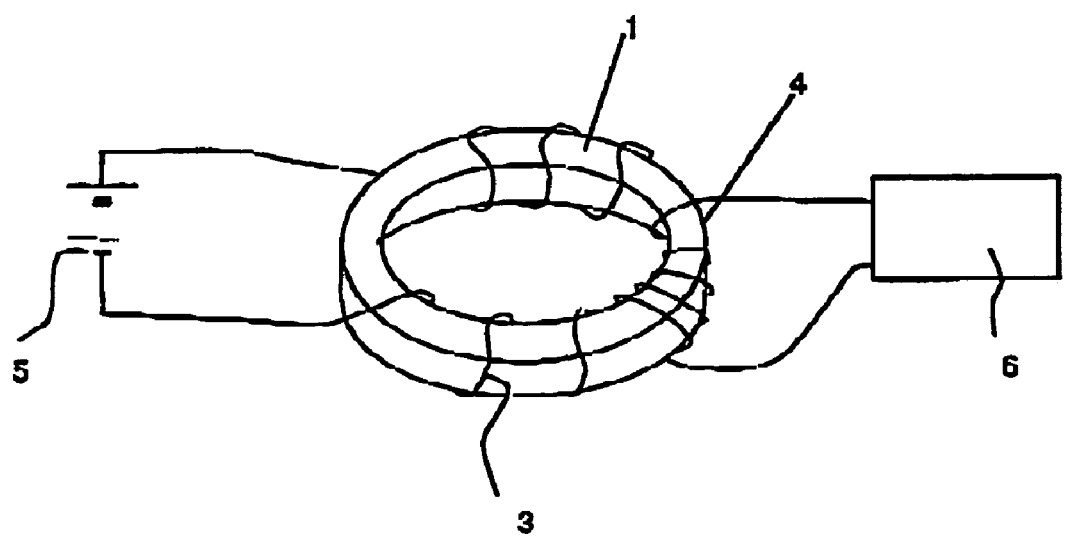
FIG. 4 is a diagram showing a method of measuring characteristics of a ferrite core of the present invention.

Further, the obtained ferrite sintered body was made into a toroidal core 1. As shown in FIG. 4, a coated copper wire having a wire diameter of 0.2 mm was used to wind, around the toroidal core 1, ten turns of a primary side winding 3 and ten turns of a secondary side winding 4. A power source 5 was connected to the primary side winding 3, and a flux meter 6 was concentrated to the secondary side winding 4. Core loss was measured under the conditions of 50 kHz and 150 mT. Surface resistance was measured in compliance with JIS C2141 Standard.

The results are presented in Table 1.

TABLE 1

| Sample No. | Firing method | | | | | | Zn concentration ratio | Surface resistance (MΩ) | Core loss (kW/m³) |
|---|---|---|---|---|---|---|---|---|---|
| | Gas allowed to flow in firing atmosphere | Partial pressure of oxygen (MPa) | Flow rate of gas wt in furnace (m³/min.) | First shielding member | Second shielding member | Bural | | | |
| 1 | Oxygen | 0.01 | $10^{-5}$ | Without | With | Not burled | 1.15 | 100000 | 230 |
| 2 | Oxygen + Nitrogen | 0.05 | $10^{-4}$ | Without | With | Not burled | 1 | 100000 | 230 |
| 3 | Oxygen + Argon | : | 0.1 | Without | Without | Not burled | 0.83 | 80000 | 210 |
| 4 | Oxygen + Nitrogen | 0.2 | 1 | Without | Without | Nor burled | 0.8 | 1000 | 180 |
| 5 | Oxygen + Agron | 0.4 | 2 | With | Without | Not burled | 0.95 | 10000 | 200 |
| 6 | Oxygen | 0.8 | 1 | Without | — | Burled in power (1) | 1 | 300000 | 250 |
| 8 | Oxygen + Nitrogen | 0.1 | 3 | With | — | Burled in powder (2) | 1.2 | 800000 | 290 |
| ✗9 | Oxygen | 0.005 | 0.1 | Without | Without | Not burled | 0.7 | 0.1 | 400 |
| ✗10 | Oxygen + Nitrogen | 0.02 | 4 | Without | Without | Not burled | 0.5 | 0.01 | 350 |
| ✗11 | Oxygen + Nitrogen | 1 | 0.5 | Without | — | Burled in powder (3) | 1.4 | 800000 | 500 |

Note:
(1) The powder contains ZnO of 25 mol %.
(2) The powder contains ZnO of 50 mol %.
(3) The powder contains ZnO of 75 mol %.
Sample marked ✗ is out of the scope of the present invention.

As may be seen from Table 1, Sample Nos. 1 to 8 of the present invention, whose Zn concentration ratio of the ferrite sintered body surface vicinity to the ferrite sintered body interior is 0.8 to 1.2, exhibited such excellent characteristics that surface resistance was not less than $10^9\Omega$, and core loss at 120° C. was not more than 300 kW/m$^3$. The mean crystal particle size of the Samples of the present invention was not less than 0.5 μm, and sintered density was not less than 4.5 g/cm$^3$.

It was found that the ferrite sintered body having a Zn concentration ratio of 0.8 to 1.2 was obtainable by a method of firing by allowing to flow into a firing furnace gas of not more than 1 m$^3$/minute per volume of 1 m$^3$ within the firing furnace in an atmosphere having a partial pressure of oxygen of not less than 0.01 MPa, or by other method of firing by disposing around a forming body a shielding member composed of a metal element oxide having a melting point of not less than 1600° C. so as to shield the gas flowing around the forming body.

On the other hand, in every one of Sample Nos. 9 to 11, whose Zn concentration ration of the ferrite sintered body surface vicinity to the ferrite sintered body interior was less than 0.8 or exceeds 1.2, the surface resistance of not less than $10^8\Omega$ was incompatible with the core loss of not more than 300 kW/m$^3$ at 120° C.

Although not presented in Table 1, a sample in the scope of the present invention was prepared by using 47.0 mol % of Fe$_2$O$_3$, 26 mol % of ZnO, 24 mol % of NiO, 2.7 mol % of CuO, and 0.3 mol % of MnO, under the conditions indicated in Table 1. This sample also exhibited such excellent characteristics that surface resistance was not less than $10^9\Omega$, and core loss at 120° C. was not more than 300 kW/m$^3$.

The carbon contents of Sample Nos. 1 to 8 were analyzed, and all of them were 60 ppm or less. All of the porosities of Sample Nos. 9 to 11 were 0.5% or less.

Example 2

Samples were prepared in the same manner as in Example 1, except that the raw material powders (main components) of Fe$_2$O$_3$, ZnO, NiO, CuO and MnO were used, and a variety of compositions were employed as indicated in Table 2.

The Zn concentration ratio of the sintered body surface vicinity to the interior was adjusted to the value indicated in Table 2. The volume resistivity of the obtained sintered body was measured in compliance with JIS C2141 Standard.

The surface resistance and the core loss value at 120° C. of the obtained sintered body were measured in the same manner as in Example 1. As a result, in every sample the surface resistance was not less than $10^9\Omega$, and a core loss at 120° C. was not more than 300 kW/m$^3$.

Then, the obtained sintered body was made into a toroidal core 1. A coated copper wire having a wire diameter of 0.2 mm was wound seven turns around the toroidal core 1, and its magnetic permeability at 100 kHz was measured on an LCR meter.

As shown in FIG. 4, a coated copper wire having a wire diameter of 0.21 mm was used to wind, wound the toroidal core 1, 100 turns of a primary side winding 3 and 30 turns of a secondary side winding 4. A powder source 5 was connected in the primary side winding 3, and a flux meter 6 was connected to the secondary side winding 4. Saturation magentic flux density was measured under the conditions of 100 Hz and 100 oersted. The results are presented in Table 2.

TABLE 2

| | Main components | | | | | Zn | | | Saturation Tagnetic flux | Volume |
|---|---|---|---|---|---|---|---|---|---|---|
| Sample No. | Fe$_2$O$_3$ (mol %) | ZnO (mol %) | NIO (mol %) | CuO (mol %) | MnO (mol %) | concentration ratio | Core loss (kW/m$^3$) | Magnetic permeability | density (T) | resistivity (MΩ · cm) |
| 12 | 50 | 35 | 9 | 5.7 | 0.3 | 0.85 | 230 | 1550 | 400 | 5000 |
| 13 | 49 | 17 | 31 | 2.7 | 0.3 | 0.91 | 240 | 230 | 440 | 5000 |
| 14 | 49 | 20.8 | 20.8 | 8 | 0.4 | 1.15 | 230 | 400 | 410 | 5000 |
| 15 | 49 | 24 | 24 | 2.995 | 0.005 | 1.03 | 210 | 330 | 420 | 5000 |
| 16 | 49 | 24 | 24 | 2.4 | 0.6 | 0.94 | 240 | 320 | 430 | 5000 |
| 17 | 42 | 27 | 27 | 3.2 | 0.6 | 08 | 200 | 500 | 430 | 10000 |
| 18 | 50 | 23 | 24 | 2.7 | 0.3 | 1.09 | 220 | 600 | 430 | 5000 |
| 19 | 50 | 15 | 29 | 5.7 | 0.3 | 1.15 | 230 | 400 | 440 | 5000 |
| 20 | 47 | 35 | 15 | 2.7 | 0.3 | 0.98 | 190 | 1200 | 400 | 10000 |
| 21 | 50 | 34 | 10 | 6.7 | 0.3 | 0.87 | 230 | 1250 | 410 | 5000 |
| 22 | 49 | 18 | 30 | 2.7 | 0.3 | 1.12 | 220 | 450 | 450 | 10000 |
| 23 | 49 | 25.2 | 26.5 | 0 | 0.3 | 0.92 | 240 | 600 | 450 | 10000 |
| 24 | 49 | 21.8 | 20.6 | 6 | 0.4 | 0.99 | 200 | 500 | 420 | 10000 |
| 25 | 49 | 24 | 24 | 2.99 | 0.01 | 0.86 | 180 | 450 | 410 | 10000 |
| 26 | 49 | 24 | 24 | 2.5 | 0.5 | 0.9 | 200 | 430 | 410 | 10000 |
| 27 | 49 | 23 | 23 | 4.8 | 0.2 | 1.1 | 170 | 550 | 440 | 10000 |
| 28 | 49 | 20 | 30 | 0.8 | 0.2 | 0.97 | 220 | 500 | 450 | 10000 |
| 29 | 49 | 30 | 20 | 0.8 | 0.2 | 1.02 | 230 | 600 | 420 | 10000 |
| 30 | 50 | 24 | 24 | 1.99 | 0.01 | 0.98 | 200 | 550 | 440 | 5000 |
| *31 | 42 | 27.5 | 27.6 | 2.7 | 0.3 | 0.7 | 800 | 300 | 350 | 2000 |
| *32 | 51 | 23 | 23 | 2.7 | 0.3 | 1.3 | 620 | 500 | 440 | 0.01 |
| *33 | 50 | 14 | 30 | 5.7 | 0.3 | 1.4 | 730 | 250 | 440 | 2000 |
| *34 | 48 | 36 | 13 | 2.7 | 0.3 | 0.6 | 660 | 1500 | 250 | 2000 |

Sample marked ✗ is out of the scope of the present invention.

As may be seen from Table 2, Sample Nos. 12 to 30, which contain 42 to 50 mol % of Fe$_2$O$_3$, 5 to 35 mol % of ZnO, 10 to 30 mol % of NiO, not more than 8 mol % of CuO, and 0.01 to 0.5 mol % of MnO, exhibited such excellent characteristics that magnetic permeability was not less than 400, saturation magnetic flux density was not less than 400 T, and volume resistivity was not less than $10^9\Omega$·cm.

On the other hand, Sample Nos. 31 to 34, of which Fe and Zn contents were out of the range of the present invention, exhibited a large core loss and a small volume resistivity.

Every Sample in the scope of the invention had a mean crystal particle size of not less than 0.5 μm and a sintered density of not less than 45 g/cm³.

Example 3

There was obtained a composition containing 48.5 mol % of $Fe_2O_3$, 25 mol % of ZnO, 25 mol % of NiO, 1.2 mol % of CuO, and 0.3 mol % of MnO. As indicated in Table 3, the amount of addition of $ZrO_2$ and $Y_2O_3$ as subsidiary component were changed variously, and firing was performed in the same firing conditions as in Sample 3 of Example 1, thereby preparing ferrite sintered bodies.

In the same manner as in Example 2, surface resistance, core loss value at 120° C., magnetic permeability, saturation magnetic flux density, and volume resistivity value were measured. The results are presented in Table 3.

TABLE 3

| Sample No. | Subsidiary components | | Magnetic permeability | Saturation magnetic flux density (T) |
|---|---|---|---|---|
| | $ZrO_2$ (Parts by weight) | $Y_2O_3$ (Parts by weight) | | |
| 35 | 0.001 | 0 | 550 | 440 |
| 36 | 0.01 | 0 | 600 | 450 |
| 37 | 0.1 | 0 | 550 | 440 |
| 38 | 0.2 | 0 | 400 | 420 |
| 39 | 0 | 0.001 | 550 | 440 |
| 40 | 0 | 0.01 | 600 | 450 |
| 41 | 0 | 0.1 | 550 | 420 |
| 42 | 0 | 0.2 | 400 | 420 |
| 43 | 0.001 | 0.001 | 550 | 440 |
| 44 | 0.01 | 0.01 | 600 | 450 |
| 45 | 0.1 | 0.1 | 550 | 440 |

As may be seen from Table 3, Sample Nos. 35 to 37, 39 to 41, and 43 to 45, which contained not more than 0.1 parts by weight of $ZrO_2$, or not more than 0.1 parts by weight of $Y_2O_3$, exhibited such more excellent characteristics that magentic permeability was not less than 550, saturation magnetic flux density was not less than 440 T, and volumed resistivity was not less than 1000 MΩ·cm. These Samples had a mean crystal particle size of not less than 0.5 μm, a sintered density of not less than 4.5 g/cm³, a surface resistance of not less than $10^9 \Omega$, and a core loss at 120° C. of not more than 300 kW/m³.

On the other hand, Sample Nos. 38 and 42, which contained $ZrO_2$ or $Y_2O_3$ in excess of 0.1 parts by weight, had a magnetic permeability of less than 500, or a saturation magnetic flux density of less than 440 T, or a volume resistivity of less than $10^9$ Ω·cm.

Example 4

There was obtained a composition containing 49 mol % of $Fe_2O_3$, 24 mol % of ZnO, 24 mol % of NiO, 2.7 mol % of CuO, and 0.3 mol % of MnO, and further containing Zr of 0.01 parts by weight in terms of $ZrO_2$, and Y of 0.01 parts by weight in terms of $Y_2O_3$. As indicated in Table 4, the specific surface area of the powder after primary grinding, calcining temperature, the mean particle size of the powder after secondary grinding, and firing temperature (with holding for two hours) were changed to prepare ferrite sintered bodies having different crystal particle sizes and sintered densities.

The mean crystal particle sizes of the obtained ferrite sintered bodies were found by taking SEM pictures of the sintered bodies, the surface of which was etched with various methods, and then averaging the diameters of inscribed circles and circumscribed circles connected to respective crystals. Sintered density was measured by Archimedes' method.

In the same manner as in Example 2, surface resistance, core loss value at 120° C., magnetic permeability, saturation magnetic flux density, and volume resistivity value were measured. The results are presented in Table 4.

TABLE 4

| Sample No. | Specific surface area (1) (m²/g) | Calc'ning temperature (° C.) | Mean particle size (2) (μm) | Firing temperature (3) (° C.) | Mean crystal particle size (μm) | Sintered density (g/cm³) | Magnetic permeability | Saturation megnetic flux density (T) |
|---|---|---|---|---|---|---|---|---|
| 46 | 10.2 | 750 | 0.4 | 950 | 0.1 | 5.1 | 500 | 400 |
| 47 | 6.6 | 850 | 0.5 | 1150 | 5 | 4.9 | 500 | 440 |
| 48 | 9.5 | 750 | 0.5 | 1000 | 1 | 5.1 | 550 | 450 |
| 49 | 8.2 | 600 | 0.6 | 1050 | 3 | 5.1 | 580 | 455 |
| 50 | 3.3 | 950 | 0.8 | 1300 | 10 | 5.1 | 600 | 460 |
| 51 | 5.1 | 800 | 1 | 1400 | 30 | 5.1 | 620 | 460 |
| 52 | 6 | 800 | 0.9 | 1450 | 35 | 5.1 | 500 | 440 |
| 53 | 5.9 | 850 | 0.8 | 1200 | 5 | 5 | 550 | 450 |
| 54 | 7.4 | 800 | 0.7 | 1100 | 3 | 5.2 | 600 | 465 |
| 55 | 4 | 900 | 0.8 | 1250 | 10 | 5.3 | 650 | 465 |

Note:
(1) Specific surface area of the powder after primary grinding
(2) Mean particle size of the powder after secondary grinding
(3) Firing temperature is held for two hours.

As may be seen from Table 4, Sample Nos. 48 to 51, and 53 to 55, whose mean crystal particle size was 1 to 30 μm and sintered density was not less than 5.0 g/m³, exhibited such more excellent characteristics that magnetic permeability was not less than 550, saturation magnetic flux density was not less than 450 T, and volume resistivity was not less than $10^9$ Ω·cm. These samples had a surface resistance of not less than $10^9$ Ω and a core loss at 120° C. of not more than 300 kW/m³.

On the other hand, Sample Nos. 46, 47, and 52, in which the mean crystal particle size of the ferrite sintered body was less than 1 μm or exceeded 30 μm, and the sintered density was less than 5.0 g/cm³ or exceeded it, had a magnetic permeability of less than 550, a saturation magnetic flux density of less than 450 T, and a volume resistivity of less than $10^9$ Ω·cm.

What is claimed is:

1. A ferrite sintered body composed of an oxide containing, as metal element, at least Fe, Zn, Ni and Mn, and containing Fe of 42 to 50 mol % in terms of $Fe_2O_3$, and Zn of 15 to 35 mol % in terms of ZnO, wherein, when a Zn concentration in an interior of the sintered body is taken to be 1, a Zn concentration in a surface vicinity is 0.8 to 1.2.

2. The ferrite sintered body according to claim 1, containing Ni of 10 to 30 mol % in terms of NiO, and Mn of 0.01 to 0.5 mol % in terms of MnO.

3. The ferrite sintered body according to claim 1, containing Zr of not more than 0.1 parts by weight (provided zero is not included) in terms of $ZrO_2$.

4. The ferrite sintered body according to claim 1, containing Y of not more than 0.1 parts by weight provided zero is not included) in terms of $Y_2O_3$.

5. The ferrite sintered body according to claim 1, wherein a mean crystal particle size is 1 to 30 μm, and a sintered density is not less than 5.0 g/cm³.

6. The ferrite sintered body according to claim 1, wherein a surface resistance is not less than $10^9$ Ω.

7. The ferrite sintered body according to claim 1, wherein a volume resistivity is not less than $10^9$ Ω·cm.

8. A method of manufacturing a ferrite sintered body including:
a primary grinding step of obtaining primary ground powder by mixing and grinding powder composed of an Fe compound and a Zn compound, and powder composed of a compound of metal element of at least one of Ni, Cu, and Mn;
a calcining step of obtaining calcined powder by calcining the primary ground powder;
a secondary grinding step of obtaining secondary ground powder by grinding the calcined powder;
a forming step of obtaining a forming body by forming the secondary ground powder into a predetermined shape; and
a firing step of obtaining a sintered body by firing the forming body in a firing furnace,
wherein in said firing step, firing is performed by allowing to flow into the firing furnace gas of not more than 1 m³/minute per volume of 1 m³ of the firing furnace in an atmosphere of not less than 0.01 MPa in partial pressure of oxygen.

9. A method of manufacturing a ferrite sintered body including:
a primary grinding step of obtaining primary ground powder by mixing and grinding powder composed of an Fe compound and a Zn compound, and powder composed of a compound of metal element of Ni, and Mn;
a calcining step of obtaining calcined powder by calcining the primary ground powder;
a secondary grinding step of obtaining secondary ground powder by grinding the calcined powder;
a forming step of obtaining a forming body by forming the secondary ground powder into a predetermined shape; and
a firing step of obtaining a sintered body by firing the forming body in a firing furnace,
wherein firing is performed by disposing around said forming body a shielding member composed of a metal oxide having a melting point of not less than 1600° C. so as to shield gas flowing around said forming body.

10. A ferrite core made by forming a ferrite sintered body according to claim 1 into a predetermined shape.

11. A ferrite coil made by winding a lead around a ferrite core according to claim 10.

12. A ferrite sintered body composed of an oxide containing, as metal element, at least Fe and Zn and at least one selected from Ni, Cu and Mn, and containing Fe of 42 to 50 mol % in terms of $Fe_2O_3$, and Zn of 15 to 35 mol % in terms of ZnO, and further containing Zr of not more than 0.1 parts by weight (provided zero is not included) in terms of $ZrO_2$, wherein, when a Zn concentration in an interior of the sintered body is taken to be 1, a Zn concentration in a surface vicinity is 0.8 to 1.2.

13. A ferrite sintered body composed of an oxide containing, as metal element, at least Fe and Zn and at least one selected from Ni, Cu and Mn, and containing Fe of 42 to 50 mol % in terms of $Fe_2O_3$, and Zn of 15 to 35 mol % in terms of ZnO, and further containing Y of not more than 0.1 parts by weight (provided zero is not included) in terms of $Y_2O_3$, wherein, when a Zn concentration in an interior of the sintered body is taken to be 1, a Zn concentration in a surface vicinity is 0.8 to 1.2.

14. A ferrite sintered body composed of an oxide containing, as metal element, at least Fe and Zn and at least one selected from Ni, Cu and Mn, and containing Fe of 42 to 50 mol % in terms of $Fe_2O_3$, and Zn of 15 to 35 mol % in terms of ZnO, wherein, when a Zn concentration in an interior of the sintered body is taken to be 1, a Zn concentration in a surface vicinity is 0.8 to 1.2, and a mean crystal particle size is 1 to 30 μm, and a sintered density is not less than 5.0 g/cm³.

* * * * *